L. SHIELDS & B. ACE.
GRAPPLING DEVICE.
APPLICATION FILED JUNE 27, 1907.

911,684.

Patented Feb. 9, 1909.

Witnesses

Inventor
B. Ace,
L. Shields,
By Dean Swift
Attorney

UNITED STATES PATENT OFFICE.

LLEWELLYN SHIELDS AND BYRON ACE, OF NICHOLSON, PENNSYLVANIA.

GRAPPLING DEVICE.

No. 911,684.  Specification of Letters Patent.  Patented Feb. 9, 1909.

Application filed June 27, 1907. Serial No. 381,049.

*To all whom it may concern:*

Be it known that we, LLEWELLYN SHIELDS and BYRON ACE, citizens of the United States, residing at Nicholson, in the county of Wyoming and State of Pennsylvania, have invented certain new and useful Improvements in Grappling Devices, of which the following is a specification, reference being had therein to the accompanying drawing.

This invention pertains to a new and useful grappling device, adapted principally for hoisting frictionally solid weights, such as stone, bulk metal, or the like.

In connection with the device, the invention aims as a primary and essential object to provide a device of this character comprising a pair of grappling members, designed to have a flexible connection between a friction pad-carrying member so as to allow the same to accommodate itself, to any surface the solid weight may have, as will be observed. After the friction pad has been set, the grappling members are securely drawn together to cause the said pads to adhere to the object to be lifted, by causing suction therebetween as will be understood.

This invention comprises further objects and combinations of elements which will be hereinafter more fully described, shown in the accompanying drawings, and the novel features thereof will be pointed out in the appended claim.

Figure 1:
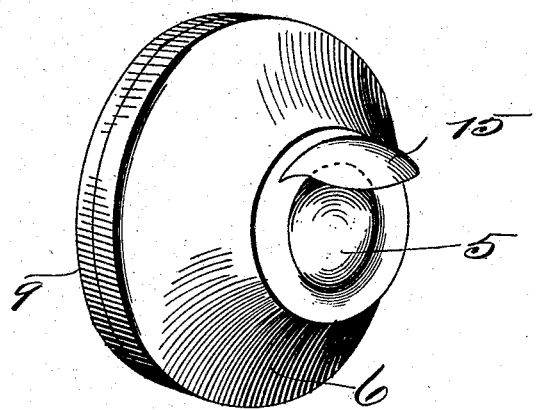
Figure 2:
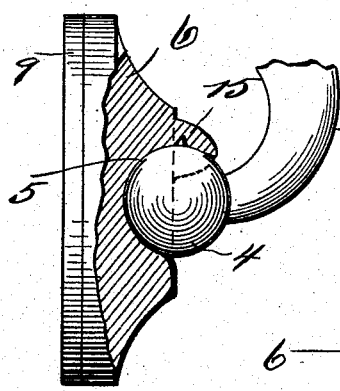
Figure 3:
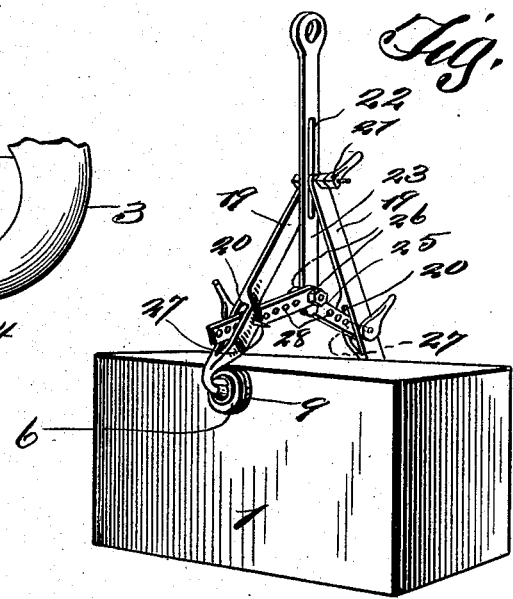

To obtain a full and correct understanding of the details of construction, combinations of features, elements and advantages, reference is to be had to the hereinafter set forth description and the accompanying drawings in connection therewith, wherein—
Figure 1 is a perspective view of the pad-carrying member. Fig. 2 is an elevation of the same partly in section. Fig. 3, is a perspective view of the grappling device showing a stone in position to be lifted.

Making renewed reference to the accompanying drawings, wherein similar reference characters indicate corresponding parts, in the several illustrations, by figures, 1 designates an object, preferably it may be termed a stone. This stone is designed to be raised by the hereinafter set forth grappling device, comprising grappling members 19, at the ends of the curved portions of which, they are provided with spherical members.

Fig. 1 of the drawings shows the pad-carrying member provided with the socket 5, and the lip or projection 15, said lip being adapted to retain the ball end of the member 3 in place. By the use of this lip or flange which is adapted to fit the curvature of the spherical member 4, the removal and a ready insertion of the spherical member may be obtained. The members 19 which terminate in the ball ends 4 are provided with slots 20, these bars being disposed angularly and connected together at their upper ends by means of a bolt and crank nut 21, which bolt plays vertically in a slot 22, of the perpendicular draw bar 23, the lower end of which is connected to the ends of the horizontal draw bars, as at 25, by means of a nut and bolt 26, as clearly shown. These horizontal draw bars play horizontally, and with a slight pivotal action in the slots 20, of the bars 19 as will be apparent. The horizontal draw bars are adjustable within said slots by means of the pins 27, and the plurality of apertures 28 within the said horizontal draw bars as will be clearly manifest.

Having thus described the invention, what is claimed as new and useful, by the protection of Letters-Patent, is:

In a device of the class described the combination with a grappling member, having a ball end, of a dish-shaped jaw member formed in one of its faces with a concaved seat, conforming in its shape with the ball end of the grappling member, and adapted to receive substantially half of said ball end, a single lip formed integral with the jaw member, said lip projecting out beyond the center of the ball end of the grappling member, the lower face of the said lip being concaved to conform to the shape of the ball end.

In testimony whereof we hereunto affix our signatures in presence of two witnesses.

LLEWELLYN SHIELDS.
BYRON ACE.

Witnesses:
W. S. DECKER,
L. E. ACE.